United States Patent
Liang et al.

(10) Patent No.: US 10,114,240 B2
(45) Date of Patent: Oct. 30, 2018

(54) SPRAYING DEVICE AND COATING METHOD

(71) Applicants: BOE TECHNOLOGY GROUP CO., LTD., Beijing (CN); BEIJING BOE DISPLAY TECHNOLOGY GROUP CO., LTD., Beijing (CN)

(72) Inventors: Kui Liang, Beijing (CN); Bin Feng, Beijing (CN); Jianfeng Yuan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 653 days.

(21) Appl. No.: 14/527,515

(22) Filed: Oct. 29, 2014

(65) Prior Publication Data
US 2015/0328647 A1   Nov. 19, 2015

(30) Foreign Application Priority Data
May 19, 2014   (CN) .......................... 2014 1 0212113

(51) Int. Cl.
*B05B 3/18*   (2006.01)
*G02F 1/13*   (2006.01)
(Continued)

(52) U.S. Cl.
CPC .............. *G02F 1/1303* (2013.01); *B05B 3/18* (2013.01); *B05D 3/10* (2013.01); *B05B 1/04* (2013.01); *B05B 1/14* (2013.01); *G02F 1/1337* (2013.01)

(58) Field of Classification Search
None
See application file for complete search history.

(56) References Cited

U.S. PATENT DOCUMENTS

| | | | | |
|---|---|---|---|---|
| 5,553,783 A * | 9/1996 | Slavas | ................... | B05B 1/3405 239/403 |
| 2003/0087464 A1* | 5/2003 | Naka | ................... | H01L 51/0005 438/30 |

(Continued)

FOREIGN PATENT DOCUMENTS

| | | |
|---|---|---|
| CN | 1695947 | 11/2005 |
| CN | 101382705 | 3/2009 |

(Continued)

OTHER PUBLICATIONS

Chinese Office Action with English Language Translation, dated Mar. 1, 2016, Chinese Application No. 201410212113.8.

(Continued)

*Primary Examiner* — Nathan T Leong
(74) *Attorney, Agent, or Firm* — Womble Bond Dickinson (US) LLP

(57) ABSTRACT

The present disclosure provides a spraying device and a coating method. The spraying device comprises a first spray unit and a second spray unit. The first spray unit is configured to spray a first solution for wetting a surface of a substrate, and the second spray unit is configured to spray a second solution for coating the surface of the substrate. During spraying, the second spray unit and the first spray unit advance in the same direction and the second spray unit is arranged behind the first spray unit in the advancing direction. In the present disclosure, the coated liquid diffuses across the surface of the substrate more quickly and uniformly, the alignment film formed on the surface of the substrate has a uniform thickness, thus avoiding mura due to an alignment film with a non-uniform thickness and improving quality of the display panel.

5 Claims, 1 Drawing Sheet

(51) Int. Cl.
  *B05D 3/10* (2006.01)
  *B05B 1/04* (2006.01)
  *B05B 1/14* (2006.01)
  *G02F 1/1337* (2006.01)

(56) References Cited

U.S. PATENT DOCUMENTS

| | | | |
|---|---|---|---|
| 2003/0189604 A1* | 10/2003 | Bae | B41J 3/407 347/2 |
| 2009/0068345 A1* | 3/2009 | Ishida | G02F 1/133711 427/68 |
| 2010/0283810 A1* | 11/2010 | Matsumoto | B41J 3/543 347/9 |

FOREIGN PATENT DOCUMENTS

| | | |
|---|---|---|
| CN | 102000639 | 4/2011 |
| JP | 2010184196 | 8/2010 |

OTHER PUBLICATIONS

Office Action in Chinese Application No. 201410212113.8 dated Jan. 4, 2017, with English translation. 6 pages.
Chinese office action with English Language Translation dated Jul. 5, 2016 Chinese Application No. 201410212113.8.

* cited by examiner

SPRAYING DEVICE AND COATING METHOD

RELATED APPLICATIONS

The present application claims the benefit of Chinese Patent Application No. 201410212113.8, filed May 19, 2014, the entire disclosure of which is incorporated herein by reference.

FIELD OF THE INVENTION

The present disclosure relates to the field of technique for fabricating a liquid crystal display, and particularly to a spraying device and a coating method.

BACKGROUND ART

In the technique for fabricating a liquid crystal panel in a thin film transistor liquid crystal display (TFT-LCD) industry, an alignment film is formed by printing an alignment liquid onto an array substrate and a color film substrate with an alignment film coating device. In the production process of a small size panel prior to the 8.5-generation line, during printing the alignment liquid, nitrogen is pressed into the alignment liquid, and a dispenser moves back and forth at both sides of an anilox roll to discharge an appropriate amount of alignment liquid, so that an appropriate amount of alignment liquid always exists on the anilox roll of the alignment film coating device, thus guaranteeing to printing the alignment film continuously. However, in the production process of the 8.5- or higher generation line, the coating of alignment liquid (e.g., polyimide PI solution) is generally performed by spraying, as shown in FIG. 1, in which droplets of alignment liquid are sprayed onto the array substrate and the color film substrate by a spraying device. The reason lies in the advantages of spraying. For example, the equipment is relatively simple, the thickness of alignment film can be adjusted during the production process, the switching period between products is short, the utilization efficiency of the alignment liquid is high, and there is no limitation regarding the products to be produced.

As the market competition is becoming fiercer, manufacturers of liquid crystal panels gradually produce high added-value products with a small size and high PPI (pixels per inch) in the 8.5-generation line to maximize their benefits. However, during productions of the products with a small size and high PPI, the flatness among pixels on the substrate is relatively poor, PI diffuses in a smaller region within the same process time, which leads to non-uniform PI coating and diffusion. As a result, the finished product may suffer from PI-related mura, which degrades the display quality and decreases the price and profit. Besides, extending the process time or performing a secondary coating may decrease the yield and thus affect the economic benefit.

SUMMARY

Technical Problem to be Solved

The present disclosure provides a spraying device and a coating method, which can avoid or at least alleviate one or more problems in the prior art. E.g., according to the solution of the present disclosure, the coating homogeneity of alignment liquid can be improved, thus avoiding an alignment film with a non-uniform thickness.

Technical Solutions

To this end, according to an aspect of the present disclosure, there is provided a spraying device, comprising a first spray unit configured to spray a first solution for wetting a surface of a substrate, and a second spray unit configured to spray a second solution for coating the surface of the substrate;

wherein during spraying, the second spray unit and the first spray unit advance in the same direction, and the second spray unit is arranged behind the first spray unit in the advancing direction.

The concentration of alignment material in the first solution can be lower than the concentration of alignment material in the second solution. In this way, the utilization efficiency of alignment liquid in the spraying device can be increased, and the cost can be reduced.

The first spray unit and the second spray unit can be connected through a connection component.

The connection component can be telescopic for adjusting the distance between the first spray unit and the second spray unit.

The first spray unit can have a first nozzle which is flat.

A liquid reservoir of the first spray unit and/or the second spray unit can have a nitrogen pressure-applying component.

The first solution can be a solvent for the alignment material or a diluted alignment liquid.

According to a second aspect of the present disclosure, there is provided an alignment liquid coating method, in which a first spray unit and a second spray unit are adopted, comprising:

during coating, advancing the first spray unit and the second spray unit in the same direction, wherein the second spray unit is arranged behind the first spray unit in the advancing direction;

spraying a first solution for wetting a surface of a substrate with the first spray unit; and spraying a second solution for coating the surface of the substrate with the second spray unit.

The concentration of alignment material in the first solution can be lower than the concentration of alignment material in the second solution. In this way, the utilization efficiency of alignment liquid in the alignment liquid coating method can be increased, and the cost can be reduced.

The first spray unit and the second spray unit can be connected to advance with the same speed.

During spraying, pressure can be applied to a liquid reservoir of the first spray unit and/or the second spray unit with nitrogen.

The first spray unit can spray by repeating a fan pattern linearly in the horizontal direction, and the second spray unit can spray linearly in the longitudinal direction.

The first solution can be a solvent for the alignment material or a diluted alignment liquid.

Advantageous Effects

According to the present spraying device and alignment liquid coating method, a first spray unit and a second spray unit are adopted, wherein the first spray unit is configured to spray a first solution for wetting a surface of a substrate, and the second spray unit is configured to spray a second solution for coating the surface of the substrate. Thus, by controlling concentrations of the liquids sprayed by the first spray unit and the second spray unit, on basis of the substrate which has been wetted by the first solution sprayed by the first spray unit, the alignment liquid sprayed by the second spray unit has an improved affinity and flowability on the surface of the substrate, and the alignment liquid diffuses on the surface of the substrate more quickly and uniformly. As a result, the alignment film formed on the surface of the substrate has a uniform thickness, thus avoiding mura due to an alignment film with a non-uniform thickness defect and improving quality of the display panel.

DETAILED DESCRIPTION OF EMBODIMENTS

Figure 1:
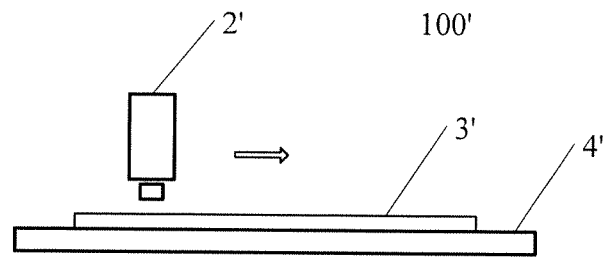
FIG. 1 is a schematic view illustrating a spraying device in the prior art.

The present disclosure will be elucidated hereinafter in details with reference to the accompanying drawings and embodiments. Apparently, these embodiments only constitute some embodiments of the present disclosure. The scope of the present disclosure is by no means limited to embodiments as set forth herein.

For ease of reading, components are suffixed with corresponding reference numerals: 100' spraying device; 2' spray unit; 3' glass substrate; 4' base; 100 spraying device; 1 first spray unit; 2 second spray unit; 3 glass substrate; 4 base; 5 connection component; 11, 21 liquid reservoir; 12, 22 conduit; 13 first nozzle; 23 second nozzle.

FIG. 1 is a schematic view for a spraying device 100' in the prior art. The spraying device 100' comprises only one spray unit 2'. The spraying device 100' has a liquid reservoir (not shown) in which an alignment liquid is stored. A glass substrate 3' is placed on a base 4'. The spray unit 2' is arranged over the glass substrate 3', is driven by a motor to advance with a constant speed and spray the alignment liquid simultaneously. The alignment liquid is coated onto the glass substrate 3'. Upon curing the alignment liquid forms an alignment film.

Figure 2:
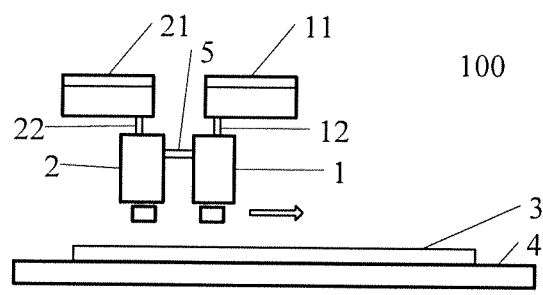
FIG. 2 is a side view illustrating a spraying device of the present disclosure.

FIG. 2 is a side view illustrating a spraying device 100 of the present disclosure. As shown in FIG. 2, the most significant difference between the spraying device 100 of the present disclosure and the spraying device 100' in the prior art lies in that two spray units, i.e., a first spray unit 1 and a second spray unit 2, are adopted. In the present disclosure, a glass substrate 3 is placed on a base 4. The first spray unit 1 is configured to spray a first solution which is used for wetting a surface of the glass substrate 3. The second spray unit 2 is configured to spray a second solution which is used for coating the surface of the glass substrate 3. The concentration of alignment material in the first solution can be lower than the concentration of alignment material in the second solution. During spraying, the second spray unit 2 and the first spray unit 1 advance in the same direction, and the second spray unit 2 is arranged behind the first spray unit 1 in the advancing direction.

Generally speaking, the first solution can be a solvent for the alignment material or a diluted alignment liquid. The second solution can be a commonly used alignment liquid. The alignment material in the alignment liquid can generally be polyimide (PI) or polyamic acid. Of course, the first solution and the second solution can also be other solutions, provided that the first solution has the ability of wetting the surface of the substrate, and the second solution has the ability of coating the surface of the substrate. All of these first solutions and second solutions fall within the scope of the present disclosure. The concentration of alignment material in the first solution can further be lower than the concentration of alignment material in the second solution.

As can be seen, the spraying device of the present disclosure adopts two spray units, i.e., the first spray unit 1 and the second spray unit 2. The first spray unit 1 is configured to spray the first solution which is used for wetting the surface of the substrate 3, and the second spray unit 2 is configured to spray the second solution which is used for coating the surface of the substrate 3. Thus, by controlling concentrations of the liquids sprayed by the first spray unit 1 and the second spray unit 2, on basis of the substrate 3 which has been wetted by the first solution sprayed by the first spray unit 1, the alignment liquid sprayed by the second spray unit 2 has an improved affinity and flowability on the surface of the substrate 3, and the alignment liquid diffuses on the surface of the substrate 3 more quickly and uniformly. As a result, the alignment film formed on the surface of the substrate 3 has a uniform thickness, thus avoiding mura due to an alignment film with a non-uniform thickness defect and improving quality of the display panel.

Further, as shown in FIG. 2, the first spray unit 1 and the second spray unit 2 further comprise a liquid reservoir 11 and a liquid reservoir 21, respectively. The liquid reservoirs 11, 21 are communicated with the first spray unit 1 and the second spray unit 2 through a conduit 12, and a conduit 22, respectively, so that the first solution and the second solution can be supplied to the first spray unit 1 and the second spray unit 2. As shown, the liquid reservoirs 11, 12 are arranged outside the first spray unit 1 and the second spray unit 2, respectively. Of course, the liquid reservoirs 11, 12 can also be integrated inside the first spray unit 1 and the second spray unit 2. A nitrogen pressure-applying component (not shown) can be used to apply a pressure to the liquid reservoir 11 and/or the liquid reservoir 21, so that the alignment liquid can be coated more uniformly. The nitrogen pressure-applying component and the method for applying a pressure are well known for the skilled in the art, and thus are not described herein for simplicity.

The first spray unit 1 and the second spray unit 2 are connected through a connection component 5, so that they advance with the same speed. The connection component 5 can be telescopic for changing its length, thus facilitating to adjust the distance between the first spray unit 1 and the second spray unit 2 and meeting the requirements for spraying products of different specifications.

Figure 3:
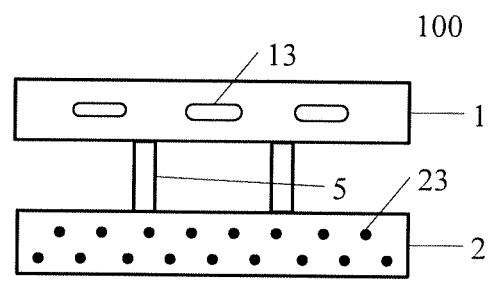
FIG. 3 is a bottom view illustrating a nozzle of a spraying device of the present disclosure.

FIG. 3 is a bottom view illustrating the spraying device 100 of the present disclosure. As shown in FIG. 3, the first spray unit 1 can have a plurality of first nozzles 13 which are arranged in the horizontal direction. The number and distance of the first nozzles 13 are determined according to process requirements. The first nozzle 13 can be flat, so that the first nozzle can spray by repeating a fan pattern linearly in the horizontal direction, and a relatively large area can be coated with a small number of nozzles. The second spray unit 2 can have a plurality of second nozzles 23 which are arranged in the horizontal direction. As shown in FIG. 3, the second nozzle 23 can be arranged into two rows, so that the second nozzle can perform coating linearly in the longitudinal direction. However, in the present disclosure, the plurality of second nozzles 23 can arranged into more rows. Since the second nozzles 23 are large in number and arranged closely, the alignment liquid can be coated more uniformly.

The present disclosure further provides an alignment liquid coating method. In the alignment liquid coating method, the first spray unit and second spray unit are adopted. During coating the alignment liquids, the first spray unit and the second spray unit advance in the same direction, and the second spray unit is arranged behind the first spray unit in the advancing direction. A first solution for wetting a surface of a substrate is sprayed with the first spray unit, and a second solution for coating the surface of the substrate is sprayed with the second spray unit. In the present disclosure, the concentration of alignment material in the first solution can further be lower than the concentration of alignment material in the second solution.

The alignment liquid coating method adopts two spray units, i.e., the first spray unit 1 and the second spray unit 2. The first spray unit 1 is configured to spray the first solution which is used for wetting the surface of the substrate 3, and the second spray unit 2 is configured to spray the second solution which is used for coating the surface of the substrate 3. Thus, by controlling concentrations of the liquids sprayed by the first spray unit 1 and the second spray unit 2, on basis of the substrate 3 which has been wetted by the first solution sprayed by the first spray unit 1, the alignment liquid sprayed by the second spray unit 2 has an improved affinity and flowability on the surface of the substrate 3, and the alignment liquid diffuses on the surface of the substrate 3 more quickly and uniformly. As a result, the alignment film formed on the surface of the substrate 3 has a uniform thickness, thus avoiding mura due to an alignment film with a non-uniform thickness defect and improving quality of the display panel.

Generally speaking, the first solution can be a solvent for the alignment material or a diluted alignment liquid, and the second solution can be a commonly used alignment liquid. The alignment material in the alignment liquid generally can be polyimide (PI) or polyamic acid. Of course, the first solution and the second solution can also be other solutions, provided that the first solution has the ability of wetting the surface of the substrate, and the second solution has the ability of coating the surface of the substrate. All of these first solutions and second solutions fall within the scope of the present disclosure. In the present disclosure, the concentration of alignment material in the first solution can further be lower than the concentration of alignment material in the second solution.

The first spray unit 1 and the second spray unit 2 can further be connected, so that they advance with the same speed. During spraying, a pressure can be applied to the liquid reservoir 11, 21 of the first spray unit 1 and/or the second spray unit 2 with nitrogen. The first spray unit 1 can spray by repeating a fan pattern linearly in the horizontal direction, and the second spray unit 2 can spray linearly in the longitudinal direction. In this way, a relatively large area can be coated with a small number of nozzles in the first spray unit 1, and the second spray unit 2 enables the alignment liquid to be coated more uniformly.

It is understood by the skilled in the art that the spraying device of the present disclosure can be applied to implement the alignment liquid coating method of the present disclosure, and that the alignment liquid coating method can adopt the spraying device of the present disclosure. Thus, the features of the spraying device can be applied to the alignment liquid coating method, and vice versa.

Although the present disclosure has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

The invention claimed is:

1. A coating method, in which a first spray unit and a second spray unit are adopted, comprising:
    during coating, advancing the first spray unit and the second spray unit in the same direction, wherein the second spray unit is arranged directly behind the first spray unit in the advancing direction;
    spraying a first solution on a surface of a substrate with the first spray unit, wherein the first solution is used for wetting the surface of the substrate, and wherein the first spray unit comprises a plurality of first nozzles, the first nozzles are flat and are arranged in a horizontal direction, and the first spray unit is configured to spray by repeating a fan pattern linearly in the horizontal direction; and
    spraying a second solution with the second spray unit in a region of the surface of the substrate on which the first solution has been sprayed, wherein the second solution is used for coating the surface of the substrate, and wherein the second spray unit comprises a plurality of second nozzles, the second nozzles are arranged into two rows in the horizontal direction, the second nozzles in one of the rows are offset with respect to the second nozzles in the other row, and the second spray unit is configured to spray linearly in a longitudinal direction.

2. The coating method of claim 1, wherein the concentration of alignment material in the first solution is lower than the concentration of alignment material in the second solution.

3. The coating method of claim 2, wherein the first solution is a solvent for the alignment material or a diluted alignment liquid and the second solution is an alignment liquid.

4. The coating method of claim 1, wherein advancing the first spray unit and the second spray unit in the same direction comprises: connecting the first spray unit and the second spray unit and making the first spray unit and the second spray unit to advance with the same speed.

5. The coating method of claim 1, further comprising: during spraying, applying a pressure to a liquid reservoir of the first spray unit and/or the second spray unit with nitrogen.

* * * * *